United States Patent [19]

Robinson et al.

[11] Patent Number: 5,522,075
[45] Date of Patent: May 28, 1996

[54] PROTECTION RING EXTENSION FOR COMPUTERS HAVING DISTINCT VIRTUAL MACHINE MONITOR AND VIRTUAL MACHINE ADDRESS SPACES

[75] Inventors: Paul T. Robinson, Arlington, Mass.; Andrew H. Mason, Hollis, N.H.; Judith S. Hall, Sudbury, Mass.

[73] Assignee: Digital Equipment Corporation, Maynard, Mass.

[21] Appl. No.: 216,509

[22] Filed: Mar. 22, 1994

Related U.S. Application Data

[63] Continuation of Ser. No. 722,882, Jun. 28, 1991, abandoned.
[51] Int. Cl.⁶ .................................................. G06F 12/14
[52] U.S. Cl. ...................... 395/700; 395/375; 395/478; 395/184.01; 395/800; 395/416; 364/DIG. 1
[58] Field of Search ..................... 395/425, 500, 395/575, 700, 800, 478, 375, 416

[56] References Cited

U.S. PATENT DOCUMENTS

| | | | |
|---|---|---|---|
| 4,742,447 | 5/1988 | Duvall et al. | 395/375 |
| 4,782,443 | 11/1988 | Matsumoto | 395/400 |
| 4,787,031 | 11/1988 | Karger et al. | 395/800 |
| 4,792,895 | 12/1988 | Tallman | 395/375 |
| 4,835,677 | 5/1989 | Sato et al. | 395/700 |
| 4,860,190 | 8/1989 | Kaneda et al. | 395/275 |
| 4,916,608 | 4/1990 | Shultz | 395/650 |
| 4,975,836 | 12/1990 | Hirosawa et al. | 395/725 |
| 5,088,031 | 2/1992 | Takasaki et al. | 395/400 |

*Primary Examiner*—Ken S. Kim
*Attorney, Agent, or Firm*—Arnold, White & Durkee

[57] ABSTRACT

In a system for implementing virtual machines a Virtual Machine Monitor (VMM) is assigned an address space separate and distinct from the address space assigned to the virtual machines (VMs). A VM-bit is used to determine whether the processor is executing a process in the VM or the VMM. Through the use of the separate address spaces and the VM-bit a system is disclosed wherein the VMM can take full advantage of all the protection rings offered by the system on which it runs and the VMs are also allowed to operate in an environment that essentially offers the same number of real protection rings as are available on the underlying computer system.

6 Claims, 9 Drawing Sheets

VMM MODE

VM MODE

CAN EXECUTE PRIVILEGED INSTRUCTIONS

PROTECTION RING EXTENSION FOR COMPUTERS HAVING DISTINCT VIRTUAL MACHINE MONITOR AND VIRTUAL MACHINE ADDRESS SPACES

This application is a continuation of application Ser. No. 07/722,882, filed Jun. 28, 1991, now abandoned.

TABLE OF CONTENTS

1. BACKGROUND .......................................... 1
    1.1 Cross References to Related Applications ....................... 1
    1.2 Field of the Invention ..................................... 1
    1.3 Operating Systems ...................................... 1
    1.4 Address Spaces .......................................... 3
    1.5 The Hierarchical Machine Concept .......................... 7
        1.5.1 Privileged Instructions ............................... 9
        1.5.2 Memory Access .................................... 10
    1.6 Virtual Machines and the Virtual Machine Monitor .............. 12
    1.7 Virtual Machines and Protection Modes-"Ring Compression" ...... 15
2. SUMMARY OF THE INVENTION ............................. 19
3. BRIEF DESCRIPTIONS OF THE DRAWINGS ..................... 21
4. DESCRIPTION OF SPECIFIC EMBODIMENTS ................. 21
    4.1 Protection-Separating Address Spaces with a VM Bit ............ 22
    4.2 Distinguishing Privileged from Sensitive Instructions .............. 25
    4.3 Simplicity Advantages ................................... 27
5. CLAIMS ................................................. 30
6. ABSTRACT OF THE DISCLOSURE .......................... 32

1. BACKGROUND

1.1 Cross References to Related Applications

This subject matter of this invention is generally related to U.S. Pat. No. 5,319,760, by A. Mason, J. Hall, R. Witek, & P. Robinson, filed Jun. 28, 1991 and issued on Jun. 7, 1994, and entitled "TRANSLATION BUFFER FOR VIRTUAL MACHINES WITH ADDRESS SPACE MATCH." Both the present invention and the subject matter claimed in the cross-referenced patent were subject to an obligation of assignment to Digital Equipment Corporation at the time the present invention was made.

1.2 Field of the Invention

This invention relates generally to the field of digital data processing systems or computer systems. More specifically, this invention relates to computer systems having multiple hierarchical protection rings (or protection rings) for regulating the access to memory locations and the executability of certain instructions. Even more specifically, the present invention relates to those computer systems having multiple protection rings that utilize a virtual machine monitor to provide one or more virtual machines.

1.3 Operating Systems

Modern computer hardware is quite powerful and can be used to accomplish many tasks. This bare hardware, however, often provides a complicated and difficult-to-use interface for the individuals or machines that seek to utilize its computing power. To increase the usability of these bare computers, "operating systems" (sometimes "OS") have been developed. These operating systems manage the basic hardware resources and provide a more simplistic and easy-to-use interface to users of the basic computing hardware than the interface provided by the bare machine.

Basically, the operating system acts as an interface between the user, or the user's programs, and the bare computer hardware. The general operation of an operating system may be described as follows: A "user" submits his "job" to the operating system for execution. A user is anyone that desires the computer hardware to do work for him or her; a job is the collection of activities needed to do the desired work. Once the operating system accepts a user's job, it may create several "processes" to enable the hardware to perform the requested activities. Generally, a process (sometimes referred to as a "task") is a computation that may be done concurrently with other computations. Associated with each process is an "address space". The address space for each process includes the collection of stored programs and data that are accessed in memory by that process. A further discussion of address spaces is contained in the following section.

Figure 1:
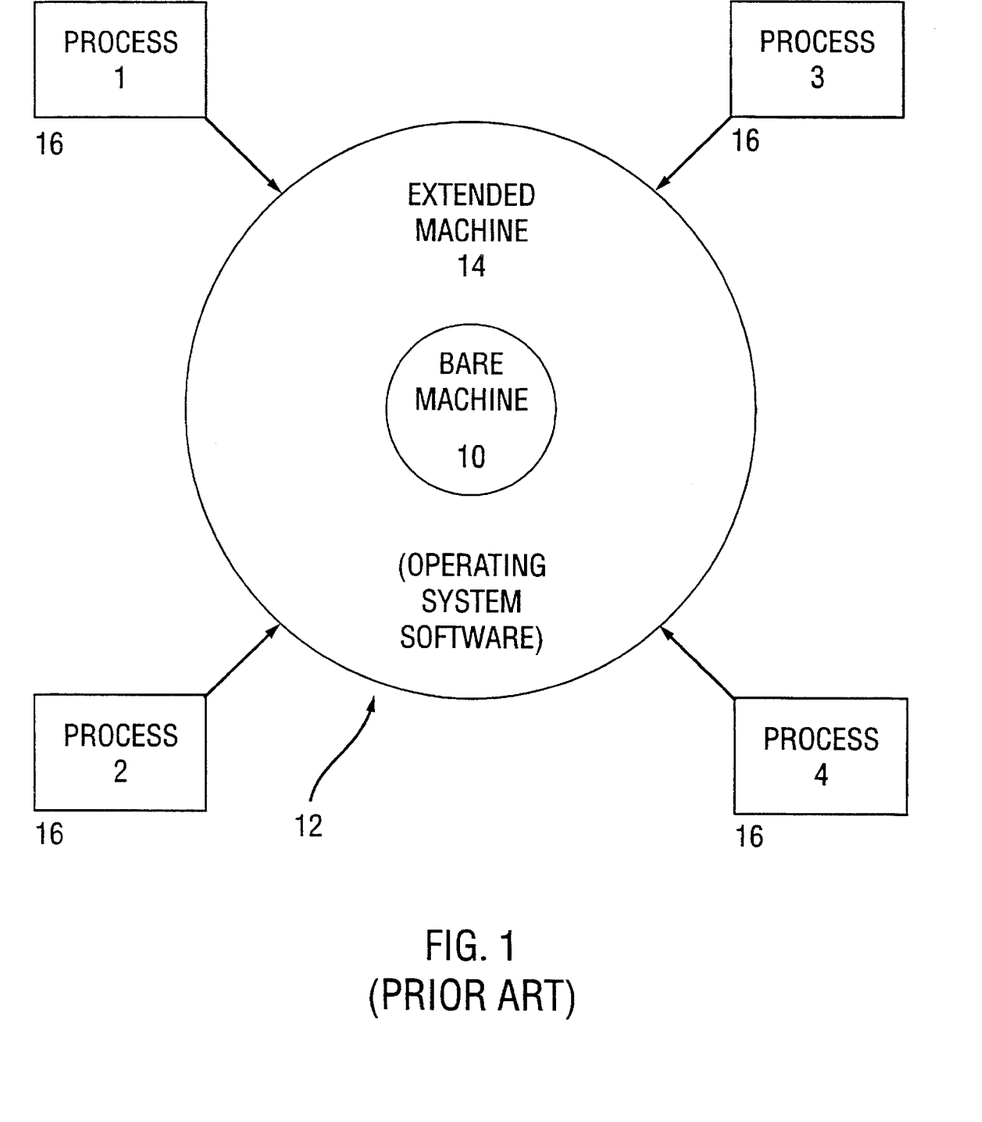
FIG. 1 generally illustrates an operating system running on a bare machine.

FIG. 1 illustrates the basic concept of an operating system. The bare computing hardware (or "bare machine") is illustrated by the innermost circle 10; and the operating system is illustrated by the outermost concentric circle 12.

Without the operating system, life would be difficult for computer users. For example, if a user wanted to copy information from a computer hardware resource (e.g., a disk drive) to another resource (e.g., main memory), he may have to provide literally thousands or tens-of-thousands of instructions to the bare machine 10 to perform such a task. When an operating system exists, however, the user's work is greatly reduced. Here, the user must merely issue a single instruction to the operating system 12; control is transferred to the operating system 12; and the task is performed. As the above example illustrates, an operating system allows the user to interact with the hardware, not only through the limited instructions available to the bare machine, but also through additional instructions that enable the operating system to perform complex or tedious tasks. The sum of these instructions is known as the "extended machine".

In FIG. 1, the extended machine 14 is illustrated as the area enclosed by the circle (or ring) representing the operating system. The users 16, or user programs, interface with the bare machine 10 through the extended machine 14. Thus, it may be said that the operating system 12 runs on the bare machine 10; and the user programs 16 run on the extended machine 14.

1.4 Address Spaces

Figure 2A:
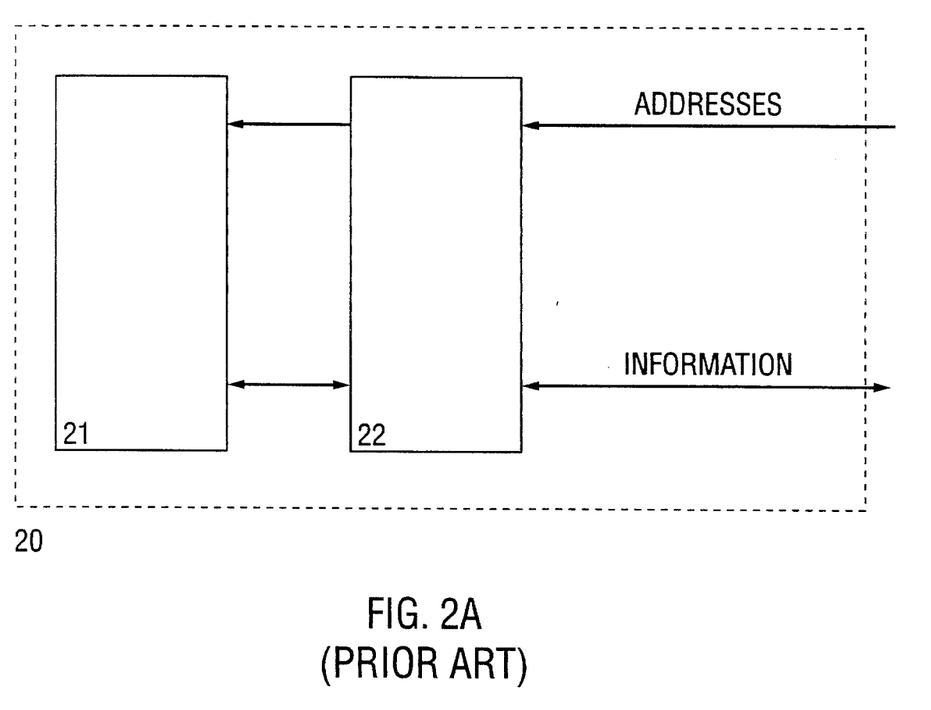
FIGS. 2A, 2B, and 2C each generally illustrate the concepts of address spaces.
Figure 2B:
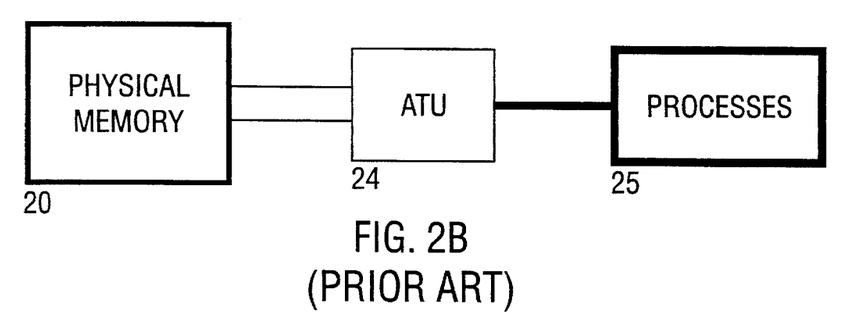
Figure 2C:
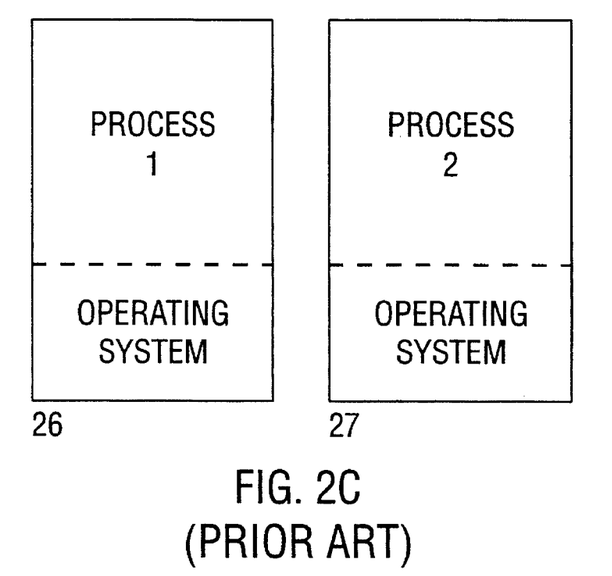

FIGS. 2A–2C generally illustrate the concept of "address spaces" as used in computer systems having one operating system and one or more processes.

Most computer systems have a certain, limited amount of memory defined by the range of possible memory addresses the computer can generate. This range of possible addresses defines the "physical address space"—so called because it is the range of addresses that the physical memory boards will respond to. Thus, in FIG. 2A the physical memory is generally illustrated as 20. Physical memory 20 generally comprises several physical address locations 21 and memory control hardware 22. The memory control hardware 22 is capable of receiving an address and either writing information to that address or reading information stored at that address.

The physical address space of the computer is seldom directly used. To enhance the operation of the computer system "virtual address spaces" are generally used to implement "virtual memory." The use of virtual memory is essentially invisible to most processes and programs running on the computer. From the process's perspective an address is generated and a memory location is referenced. When virtual memory is implemented, however, the physical address of the memory referenced is usually not the same as the virtual address generated by the process. The use and implementation of virtual memory is known in the art and is only generally discussed herein.

FIG. 2B illustrates one implementation of virtual memory. As illustrated, an address translation unit (ATU) 24 is between the processes/programs 25 and the memory hardware 20. The address translation unit may utilize hardware, software, and firmware for converting virtual addresses to physical addresses. Further, the ATU is generally not an isolated piece of hardware in the computer system. It is illustrated as such here, however, to emphasize the concept that the virtual addresses generated by computing processes are translated to real addresses before physical memory is addressed. Methods for implementing address translation are generally known in the art and will not be discussed in detail herein. Additional discussion of address translation may be found in the co-pending application "TRANSLATION BUFFER FOR VIRTUAL MACHINES WITH ADDRESS SPACE MATCH."

In prior art systems, the ATU 24 can utilize several address maps that are under the sole control of the operating system. Basically, an address map is a listing of physical and virtual addresses, indexed by the virtual address. Thus, whenever a virtual address and an address map are presented to the ATU 24, the ATU 24 may find the proper physical address by looking up the virtual address in the appropriate address map.

In most cases, when virtual memory is used, each process has its own address space; i.e., each process is associated with a distinct virtual-to-physical address map. Further, when the processor is executing instructions from a certain process it is able to determine which address map is assigned to that process. Thus, if a first process wants to share certain memory locations with a second process, it must generally arrange with the operating system (which controls the address maps) that parts of the first process's address map will point to the same physical memory as pans of the second process's address map. The operating system must be involved if such sharing of memory is to be implemented since it controls the address maps.

In many prior art systems, processes and the operating system share pans of the same address spaces; i.e., the process and the operating system may use different parts of the same address maps. Such a system is illustrated graphically in FIG. 2C. FIG. 2C illustrates a first address space 26 (i.e., an address map) wherein the same address map is used to translate virtual addresses generated by the process and the operating system. A second address space 27 is illustrated where a second process and the operating system share the second address map. In such "address space sharing" systems, each process is generally associated with a separate address map, and the portions of those address maps corresponding to the virtual memory locations assigned to the operating system are usually identical.

In the address space sharing systems, because the virtual-to-physical translation mechanism is the same for a given virtual address regardless of whether it was generated by a user process or the operating system, absent some sort of protection mechanisms in such a system, there is nothing to prevent the process from generating virtual addresses identical to those generated by the operating system and, via the address map, accessing the physical memory location that is supposed to be reserved for the operating system. As discussed in the next section, however, in most such systems, a protection-ring system is used to prevent unauthorized processes from accessing memory locations associated with the operating system. In such systems, the entries in the address map contain additional information, e.g., the ring number, that is used by the system to provide secure operation. Thus, even if a user process generated a virtual address corresponding to a physical memory location reserved to the OS, the ring number associated with that virtual address would prevent the process from accessing that location since in most such systems the process, hardware, or firmware interpreting the address map will allow access for that location only to processes running in the most privileged ring and only the OS is allowed to run in that ring. Thus, in most prior art systems where address spaces are shared by the OS and the other processes, ring-protection is essential to ensure secure operation.

1.5 The Hierarchical Machine Concept

Because several processes may exist at one time, the potential exists that one process may access and modify data or programs stored in the address space of another process. Further, the potential exists that one process will access and modify portions of the address space associated with the operating system. For example, many computer systems include system resources such as compilers and interpreters for converting programs written in high-level language into machine code which may be executed by the processor. It is generally undesirable to allow a user program to access directly the memory locations allocated to the compilers or interpreters.

In addition to it being undesirable for all processes to have access to all memory locations, it is also undesirable to have all processes capable of using certain "privileged" instructions. For example, the HALT instruction causes the processor to halt processing. Obviously, it would be undesirable to allow any user process to unilaterally halt all processing on the computer system.

To avoid the problems discussed above, many computer systems are provided with a hierarchy of "protection rings" (sometimes referred to as protection levels or protection modes). The protection rings shield programs which control system resources from other programs, e.g., user programs, and allow access to the shielded programs only in a controlled manner. For example, one computer system (the VAX-11 family of systems sold by the assignee of the present invention) has four protection rings referred to as the kernel, the executive, the supervisor, and the user (or ring 0, ring 1, ring 2, ring 3). The computer processor may be executing instructions in any of these four rings depending on the particular process making use of it. In the VAX-11 system, input/output functions and transfers to and from memory are performed only if the processor is executing in the kernel (ring 0) and the kernel is the only ring from which privileged instructions can be executed. Less protected system resources, such as programs controlling the file system run in executive mode (ring 1); while other programs, such as the interpreter for commands typed in by a user runs in supervisor mode (ring 2). Compilers and basic applications programs run in user mode (ring 3).

Strictly speaking, it is the computer processor that operates in one of the many protection rings. For ease of discussion, however, certain processes are referred to herein as residing in a certain protection ring or running in a certain mode. What this means is that the processor will be in a certain mode when it is executing instructions necessary for a particular process. For example, if there is a certain process X, and the processor will be in ring 2 when it is executing instructions necessary to complete process X, then process X may be said to reside in the ring 2 or to be running in that ring.

The above discussion is made in terms of a single "processor." It should be noted, however, that certain computer systems have "processors" that comprise more than one processing unit. The present invention includes such multi-processor computer systems and when reference is made in the description to a "processor" it includes multi-processor systems.

In most systems, the protection rings are utilized in two ways: (1) for controlling the execution of privileged instructions; and (2) for controlling the access to certain memory locations.

1.5.1 Privileged Instructions

If the processor receives a privileged instruction, it must first determine if it is in the proper mode to execute that instruction. If it is, the processor executes the instruction; if not, it "traps" the instruction; i.e., it transfers control to an exception routine or other process for handling the instruction.

In the VAX-11 system, as in many other systems, privileged instructions can only be executed when the processor is running in the most privileged or kernel mode (ring 0). In those systems, if a processor in any other mode receives a privileged instruction it will transfer control to a process in the kernel (ring 0). Thus, a privileged instruction is defined for purposes of this disclosure as an instruction that "traps" to the most privileged mode when executed by any but the most privileged mode.

The determination of which instructions should be privileged instructions depends on the specific computer hardware/software used and the security requirements of the system. Methods for selecting such instructions are generally known in the art and will not be discussed in detail.

In addition to having "privileged" instructions that trap to the most protected mode when they are submitted by processes residing in other than that mode, it may be desirable to have multiple levels of protected instructions that trap to a mode of greater protection if submitted by a less protected mode; e.g., certain instructions that trap to a process in the executive mode (ring 1) when submitted by any process not in the executive or kernel mode. Such protected instructions will operate in a manner similar to the privileged instructions, except that they trap to some mode other than the most protected mode.

1.5.2 Memory Access

In addition to controlling the executability of privileged instructions, protection modes are also used to control memory access. In most systems that use protection modes, each location in memory is accessible only when the processor is executing in one of a predetermined set of operating modes. Further, each memory location may be accessible only in a particular way. For example, a memory location may be read by programs in a particular operating mode but not written, or written by programs operating in any mode more privileged than a particular mode. As a further example, when the processor is running programs in a mode other than the most privileged mode (ring 0) it may not be able to access portions of memory reserved to programs which operate in ring 0.

Figure 3:
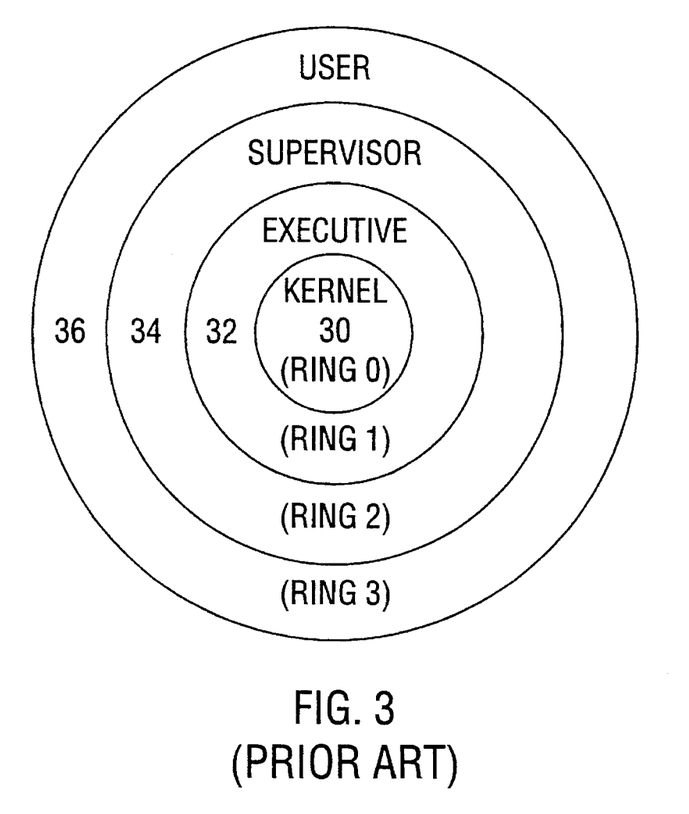
FIG. 3 illustrates a multiple ring protection system.

FIG. 3 illustrates one system having four available protection rings. In practice a multiple protection ring system may have greater or fewer rings. As noted in FIG. 3, the rings are concentric with the most protected mode 30, kernel mode (ring 0), being in the center and the executive mode 32 (ring 1), supervisor mode 34 (ring 2), and user mode 36 (ring 3) proceeding from the center. As noted above, only when the processor is executing in the most privileged mode (ring 0) 30 can privileged instructions be executed; all other attempts result in a trap to processes in the kernel mode (ring 0) 30.

Further, in most instances memory access is controlled by the protection mode. For example, in one embodiment, if a certain memory location is accessible to processes in the supervisor mode (ring 2) 34, it is also accessible to processes in the executive mode (ring 1) 32 and the kernel mode (ring 0) 30 (since those rings are within the supervisor ring)—but not in the user mode (ring 3) 36. In this embodiment, memory locations that are accessible when the processor is in the user mode (ring 3) are generally accessible to processes in all modes. Alternate embodiments are envisioned wherein memory access is specified for each protection mode individually, e.g., a memory location accessible to the supervisor mode may be inaccessible to the executive mode. The present invention is not dependent on the protection model within a specified address space as long as distinct address spaces are inaccessible to each other.

Specific operating systems have developed to take advantage of the protection features offered by multiple protection rings. For example, many operating systems have been developed that run solely in the most protected mode (ring 0). Thus, any process that attempts to execute a privileged instruction will be trapped to the operating system's control and only the operating system can access memory locations addressable by the most protected mode. Other computer processes, other than operating systems, have been designed to take full advantage of the security offered by multiple protection rings. Such processes often have sub-processes that operate in different protection rings in order to optimize the efficiency and security of the overall process. For such specially designed processes it is essential that all of the protection rings available on the computer be available to the process.

1.6 Virtual Machines and the Virtual Machine Monitor

Many computers today operate on a "timesharing" basis where a number of users are allowed to run a number of different computer applications on a single system. This is generally accomplished by having the operating system: (1) keep track of the data and instructions from each user; (2) schedule the running of the application programs on a rotating basis; and (3) transmit the processed data to the users when the processing is complete.

One problem with most timesharing systems is that they generally use a single operating system on which all of the application programs run. Although certain applications run better on certain operating systems than others, the use of a single operating system does not permit the selection of others. Another problem with such systems is that if a given software system (e.g. a database manager) is to be revised or replaced, the revision and testing cannot generally take place concurrently with the use of the original system, resulting in decreased availability.

To enable users to select among various operating systems, and to permit increased availability during times of revision of various software systems, it would be convenient to have a second computer system. Thus a user could select an alternate operating system, or a software system could be revised and tested, without impacting the original computer system. However, purchasing and maintaining this second computer system may add significant expense and overhead for the owner of the system.

One way to provide the effect of a second computer system, without actually purchasing and maintaining one, is to use a "virtual machine" (VM) system. In such a system, a "virtual machine monitor" (VMM) multiplexes the resources of a single computer system so as to provide the effect of multiple independent computer systems. Each virtual machine provides its own computing environment, similar to the environment provided by a traditional operating system in a non-VM system.

One common method of achieving this is for the VMM to provide VMs which appear to be duplicates of the machine the VMM runs on. One set of requirements for providing such virtual machines may be found in Popek and Goldberg, *Formal Requirements for Virtualizable Third Generation Architectures,* COMMUNICATIONS OF THE ACM (July 1974). Popek and Goldberg define a virtual machine as an isolated, efficient duplicate of the underlying real machine. One advantage of providing this type of virtual machine is that a traditional operating system which runs on the real machine can easily be made to run on the virtual machine. This is the type of virtual machine considered by the present invention.

The VMM may be considered to be the real machine's operating system; it runs on the bare machine, and provides multiple independent interfaces that essentially duplicate the interface provided by the bare machine. Unlike traditional operating systems, this interface is intended for direct use only by other programs (e.g. operating systems), not by users. These other programs may provide an interface for the users.

Because the VMs appear as complete systems, they are often used to support different operating systems. Thus, while in a traditional computing system there would be only one machine with one operating system, when a VMM is used there can be multiple virtual machines running distinct operating systems. As with an OS running on a bare machine, each OS running on a VM may support several users and several user programs.

Figure 4A:
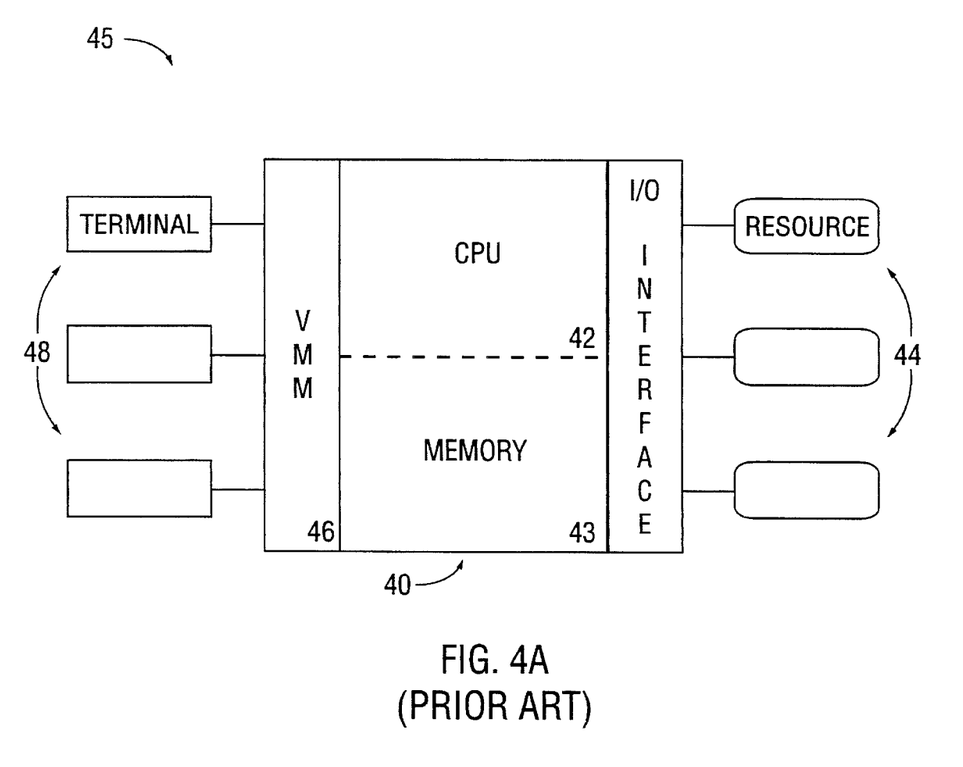
FIGS. 4A and 4B each illustrate the implementation of virtual machines.
Figure 4B:
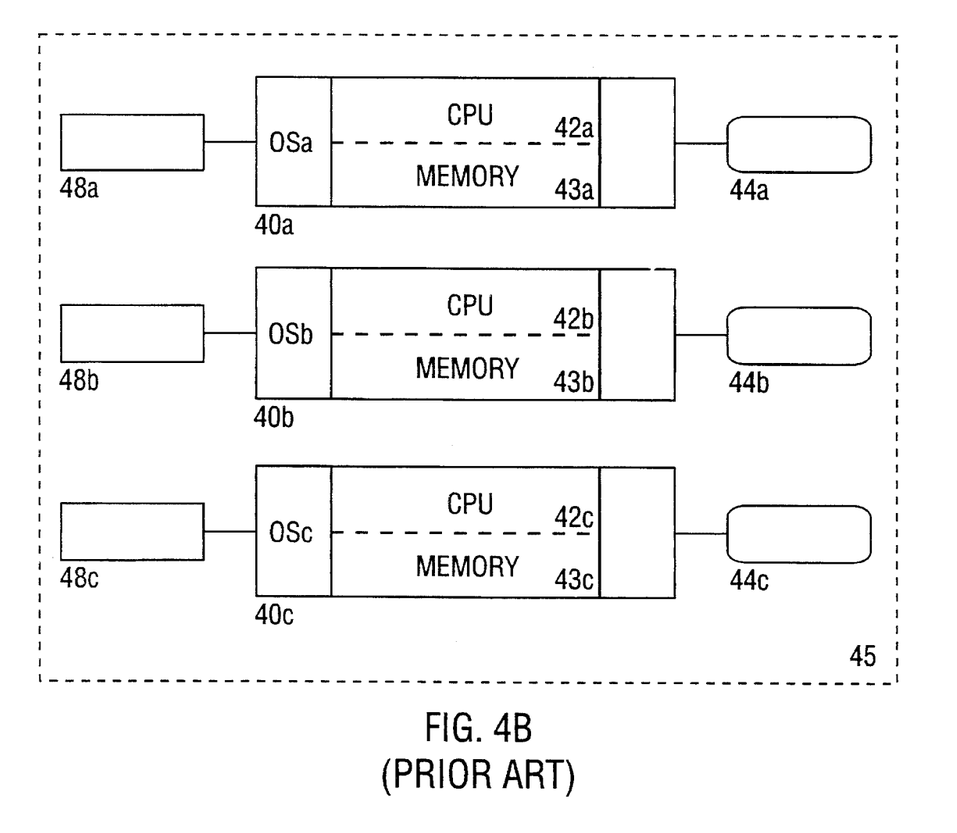

FIGS. 4A–4B illustrate one such VMM system 45. As FIG. 4A illustrates, the basic structure consists of the bare machine 40, including a central processor 42, a memory 43, and numerous system resources 44 on which a virtual machine monitor 46 is running. Multiple users have access to the computer system via interface devices such as computer terminals 48.

FIG. 4B illustrates the situation as it appears to the users when the VMM 46 is in operation. As noted there are three virtual machines, 40a, 40b, 40c, each associated with a central processor 42a, 42b, 42c, and a memory 43a, 43b, 43c. Each VM is also associated with several computer resources 44a, 44b, 44c. A separate operating system (OSa, OSb OSc) is running on each of the VMs. Thus, each user operating on his terminal 38a, 38b, 38c, will interface with his appropriate OS on a VM as if he were interfacing with that OS running on a bare machine. Additional background discussion concerning virtual machines, VMMs, and operating systems may be found in S. Madnick & J. Donovan, OPERATING SYSTEMS (McGraw-Hill 1974). Virtual machines are also described by Siewiorek et al. in COMPUTER STRUCTURES: PRINCIPLES AND EXAMPLES at 227–28 (McGraw-Hill 1982).

1.7 Virtual Machines and Protection Modes-"Ring Compression"

The use of virtual machines and VMMs created significant problems that did not exist on bare machine, single OS systems. For example, on a bare machine, single OS system the multiple protection layers discussed above can be used to control and regulate access to memory locations and the execution of privileged instructions. Such is not necessarily the case when a VMM is used.

When VMs are used there must be some mechanism for preventing the virtual machines from affecting (or being affected by) the execution of any other VM or the VMM itself. In the prior art the most common mechanism used to achieve such objectives was known as "ring-compression."

In ring-compression, the VMM is generally designed such that it operates only in the most privileged mode. In the VAX system, this means the VMM operates in the kernel mode (ring 0). All other processes share and utilize the other protection modes.

Because the most privileged mode is reserved to the VMM, the VMs are prevented from running in the most privileged mode (ring 0). This creates several problems.

First, the fact that the VMs cannot run in the most protected mode is in conflict with the previously stated objective of the VM: to provide an interface that is as close as possible to the bare machine. Second, since the VM is precluded from running in the most protected mode, the VMM must include some mechanism for making it appear to the user (or the OS running on the VM) that the VM is running in that mode. This requirement (that the VMM be able to make the VM appear to be running in the most protected mode) often causes the VMM to include extensive and complex processes.

A further difficulty created by ring-compression is that the VMM cannot readily take full advantage of the multiple protection rings. In a process where the VM may run, the VM has the use of all but the most privileged ring; in particular, the VM may access any memory protected so that it is accessible to any ring other than the most privileged ring. If the VMM were to use one of these "outer rings" for its own purposes, to the extent that the VMM did so it would not be protected from the VM. Therefore the VMM may not use these rings in a process which is also used by a VM. (The VMM may choose to create a process which is not used by any VM; within the context of that process, the VMM is free to use the outer rings as it sees fit. This use of processes is known in the art and is not discussed further.)

Figure 5:
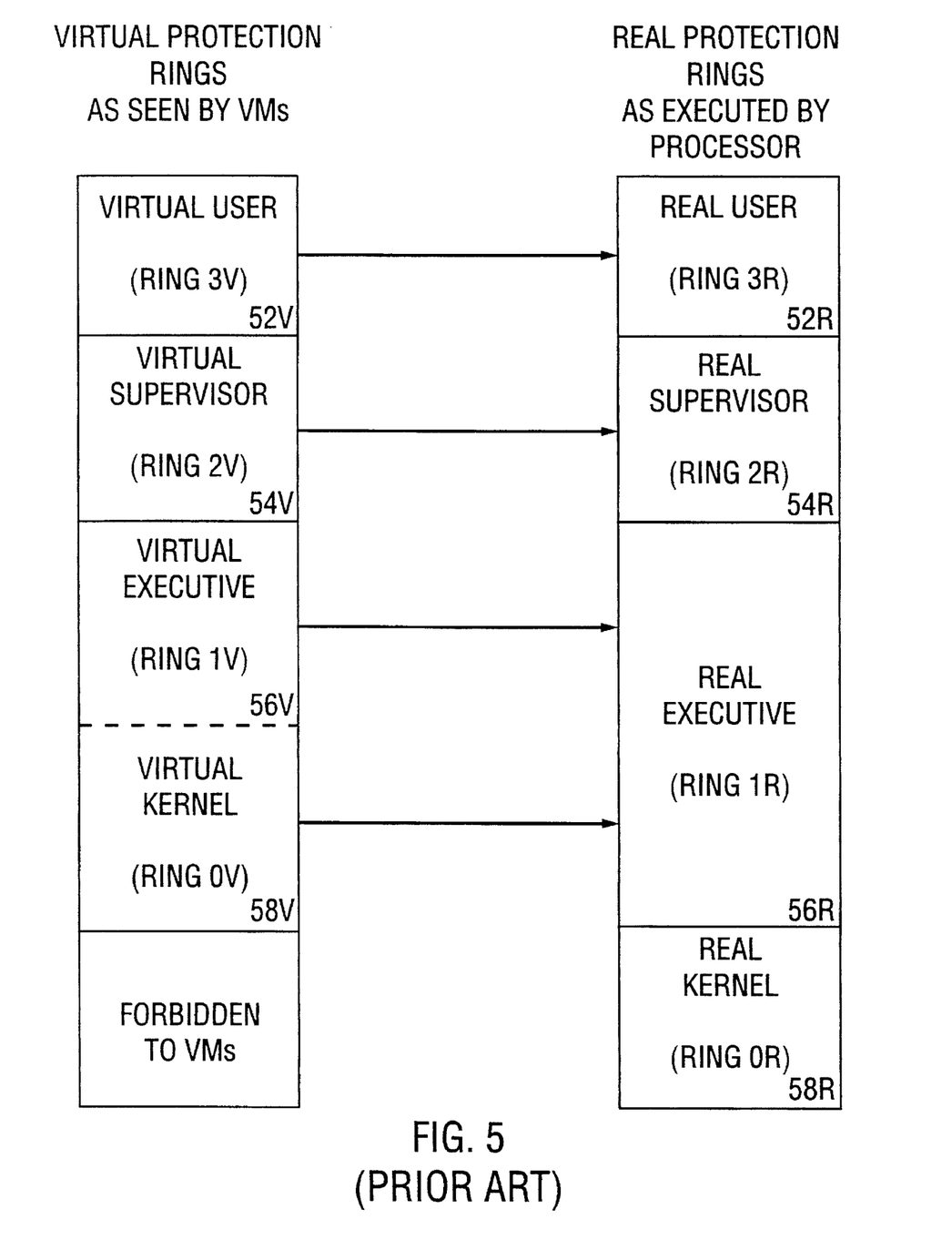
FIG. 5 illustrates the prior art method of ring-compression.

FIG. 5 illustrates one way in which ring compression may be accomplished in the VAX system where there are four protection rings. As may be seen, the virtual user 52v (ring 3v) and supervisor 54v (ring 2v) modes are mapped to the real user and supervisor modes 52r, 54r (rings 3r, 2r). Thus, processes running on a VM (or the VM itself) that execute in the user or supervisor mode will actually be operating in those real modes.

The VM executive mode 56v (ring 1v) is mapped to the real executive mode 56r (ring 1r). As with the user and supervisor modes, for this mode the real processor will be in the same protection mode when executing this instruction as the virtual processor.

Because the real kernel mode 58r (ring 0r) is assigned exclusively to the VMM, the virtual kernel mode 58v (ring 0v) is mapped to the real executive mode 56r (ring 1r). Thus, instructions that the software in the VM believes are executing on a virtual processor in the kernel mode are in fact being executed by the real processor in the executive mode.

The operation of a system using ring-compression is as follows: as noted above, there are certain instructions, privileged instructions that trap to a process in the most protected mode. Another group of instructions, "sensitive instructions" are those instructions which read or change the privileged machine state. Thus, if a VM is allowed to execute a sensitive instruction, it can change the machine state in a manner that would affect all other VMs and the VMM.

The general concept of ring-compression is based on the notion that all sensitive instructions are also privileged instructions. If all sensitive instructions are privileged and the VMM through ring-compression prevents the VMs from executing in the most privileged mode, then all sensitive instructions executed by the VM will trap to the most privileged mode (i.e., where the VMM is) and the VMM can emulate the effect of the sensitive instruction. In some computer systems, not all of the sensitive instructions are privileged. In that case, the VMM must arrange to trap or otherwise emulate all the sensitive instructions executed by the VM so that their effects are confined to the executing VM. A further discussion of ring-compression and sensitive unprivileged instructions may be found in U.S. Pat. No. 4,787,031 to Karger et al., entitled "COMPUTER WITH VIRTUAL MACHINE MODE AND MULTIPLE PROTECTION RINGS" and J. Hall & P. Robinson, *Virtualizing the VAX Architecture* in PROCEEDINGS OF THE 18TH INTERNATIONAL SYMPOSIUM ON COMPUTER ARCHITECTURE (ACM Press 1991).

While ring-compression schemes have allowed a VMM to support several VMs, they have several drawbacks:

First, in a process where a VM may run, the VMM is constrained to the most privileged ring and cannot take full advantage of the multiple protection rings available on many systems;

Second, the VMs are constrained to less than the full number of available real modes. This poses difficulties because the software that generally runs on a VM is designed to utilize all of the available real protection modes;

Third, because the VMM must essentially make the VMs believe they are running in the real ring 0, it is often quite complex and difficult to design and modify;

Fourth, because the VMs cannot execute in real ring 0, all memory locations that the VM ring 0 processes must address must be made available to processes operating in the real ring 1 (in which the VM ring 0 is emulated), this results in a reduction of security because processes operating in the virtual ring 1 (real ring 1) can now access processes operating in virtual ring 0 (also real ring 1).

2. SUMMARY OF THE INVENTION

The present invention provides a computer system whereby both the VMM and the VMs are allowed access to essentially all of the protection modes. In addition, the VMM is provided with its own domain, protected from the VMs, where all available protection rings may be utilized, in which to control the real machine and prevent the VMs from affecting each other.

This result is accomplished by doubling the number of available protection rings to create a dual ring system where both the VMM and the VMs have access to all of the available protection rings. This dual ring system is made possible by placing the VMM in an address space separate and distinct from that of the VMs and using a special VM-bit to indicate whether the currently executing process is in a VM or the VMM.

Through this novel use of the address space and the virtual machine bit, several advantages are obtained. In particular, the present invention allows the VMM to take advantage of all of the protection layers; allows for simplification of the VMM; and allows the VMs to operate in what is essentially the real ring 0.

4. DESCRIPTION OF SPECIFIC EMBODIMENTS

To overcome the disadvantages associated with ring-compression, the present invention effectively doubles the number of available protection rings—thus allowing both the VMs and the VMM access to all of the available protection rings while ensuring that the VMM remains in control of the hardware.

In most prior art systems, the protection rings alone serve two distinct functions: protection and privilege. These functions are implemented in the present invention, not only through the use of protection rings, but also through the use of separate address spaces for the VMs and the VMM, and a special bit (the VM-bit) to indicate if instructions are from a process in the VMM or one of the VMs.

4.1 Protection-Separating Address Spaces with a VM Bit

The protection function essentially prohibits less secure code or processes from accessing memory locations that are associated with more secure processes. For example, in ring-compression systems, processes operating in the supervisor mode (ring 2) cannot access information that is accessible only by processes in the kernel (ring 0) or executive (ring 1) modes. In most prior art systems, protection rings alone are used to prevent the VMs from accessing memory locations utilized by the VMM.

In the present system, in contrast, this protection function is handled in two ways: (1) by using separate address spaces for the VMs and the VMM; and (2) by permitting the VMs to access only the physical memory assigned to them by the VMM.

In the present invention the address space for the VMs is distinct and separate from the address space available to the VMM. Thus, in contrast to the prior art systems, the VMM, by controlling the address maps for the VMs, can prevent a VM from accessing a protected memory location even if the protection functions offered by protection rings are unavailable.

Figure 6A:
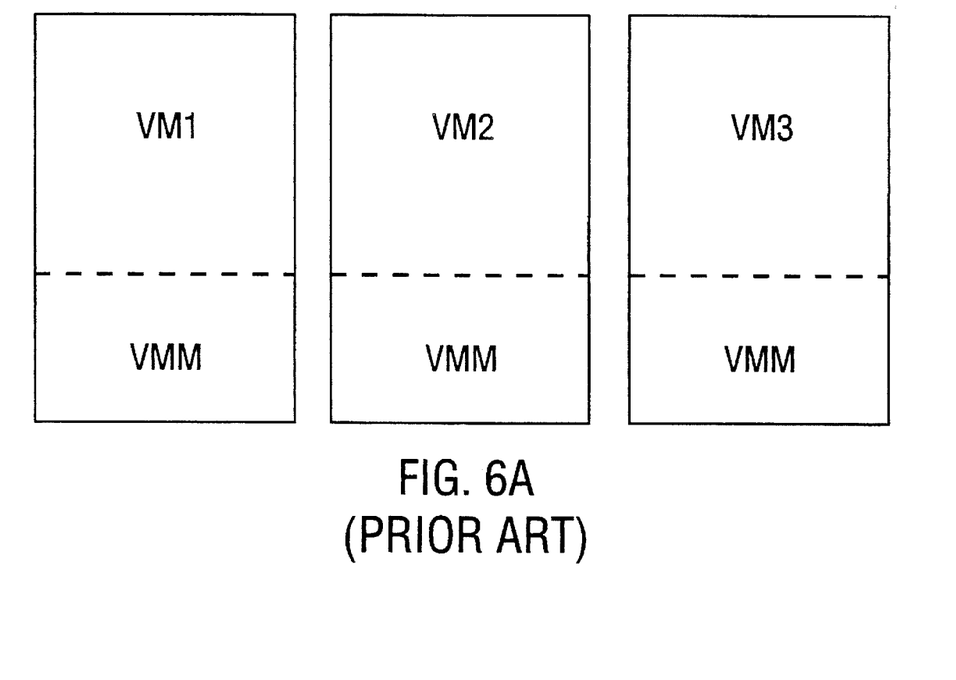
FIGS. 6A and 6B each illustrate the control of the address spaces.

Analogous to the operation of processes and the operating system discussed in section 1.4 above, is the operation of virtual machines and the virtual machine monitor in many prior art systems. FIG. 6A illustrates a system wherein the virtual machine monitor and the VM share address spaces. As illustrated, a separate address space (i.e., address map) is associated with each VM. Further, each of the address spaces is shared both by its associated VM and the VMM. Because the VM and the VMM share the same address map, ring-protection is used to prevent the VMs from accessing the physical memory locations devoted to the VMM. As discussed above, in order for such ring protection to be effective, the VMM is restricted to running in the most privileged ring. Thus, (at least for a process and address space used by both a VM and the VMM) the protection requirements of most prior art address space sharing systems, mandated that the VMM be restricted to a single protection ring.

Figure 6B:
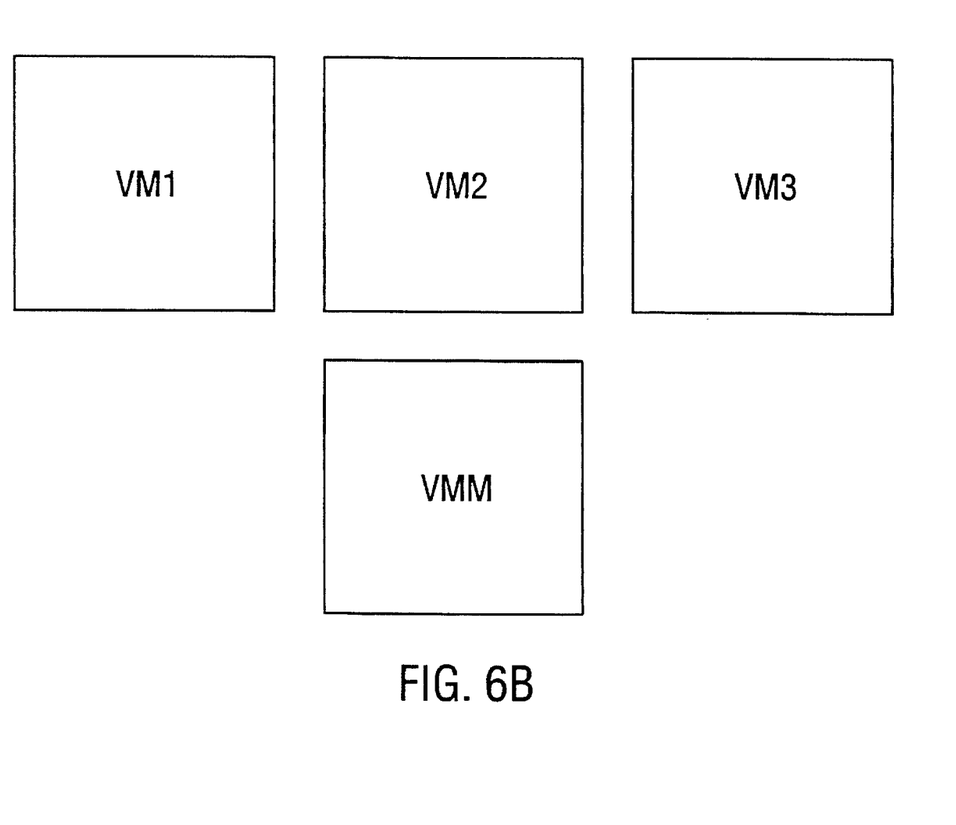

FIG. 6B generally illustrates the address spaces of the present invention. As illustrated there are complete, separate address spaces (address maps) associated with each VM and with the VMM. Thus, the VMM lies in an address space distinct and isolated from all of the VMs. Because separate address maps are associated with the VM and the VMM, whenever the processor is executing instructions from a process in a VM, that VM's address map will be used to perform virtual-to-physical translations and, when the processor is executing instructions from the VMM the VMM address map will be used. Since the VMM address map is distinct from the VMs' address maps, the only way a VM can access a physical memory location dedicated to the VMM is if one of the VMs' address maps has a virtual address that points to that physical address. Such a situation can be prevented in the present invention, however, because the VMM has control over all of the address maps to the exclusion of the VMs.

In the present invention the VMM, like the OS in the above described system, has control over all of the address maps. Thus, by ensuring that not one of the virtual addresses in the VMs' address space corresponds to a physical address reserved to the VMM, the VMM can protect itself from interference from the VMs. Since separate address spaces—not protection rings—are used to protect the VMM, the VMM is no longer confined to only the most privileged mode and can take advantage of all the available protection modes offered by the computer system.

Since the VMM controls the system, it must control the "real address maps." As used in this specification, the real address maps are those address maps used to translate a virtual address to the physical address supplied to the memory hardware. Because, the VMs must appear to be running on the bare machine and operating systems often create their own address maps, the VMs should have the ability to create their own address maps, translating addresses generated by the processes supported by the VMs. In these cases, the address maps used by the VMs are not the "real address maps" since the address generated by the VMs' address map must be supplied to the proper "real address map" (maintained by the VMM) before the physical memory location is accessed. In such situations, the VMM may refer to the VMs' address maps in creating the real address maps that the address translation hardware uses.

In the present invention, because the VMM controls all the real address maps for each address space in each VM, the VMM knows all the virtual-to-physical mappings. Therefore, the VMM may access any part of a VM's memory by arranging to map some part of the VMM's own address space to the same physical memory mapped by the desired part of the VM's address map. Further, because all VM address maps must be filtered by the VMM's real address maps, the VMM can prevent a VM from accessing the real memory of any other VM and from accessing the real memory of the VMM.

4.2 Distinguishing Privileged from Sensitive Instructions

In addition to providing protection, prior art systems utilize the privileged ring system to provide a method for controlling the execution of certain privileged instructions.

Figure 7A:
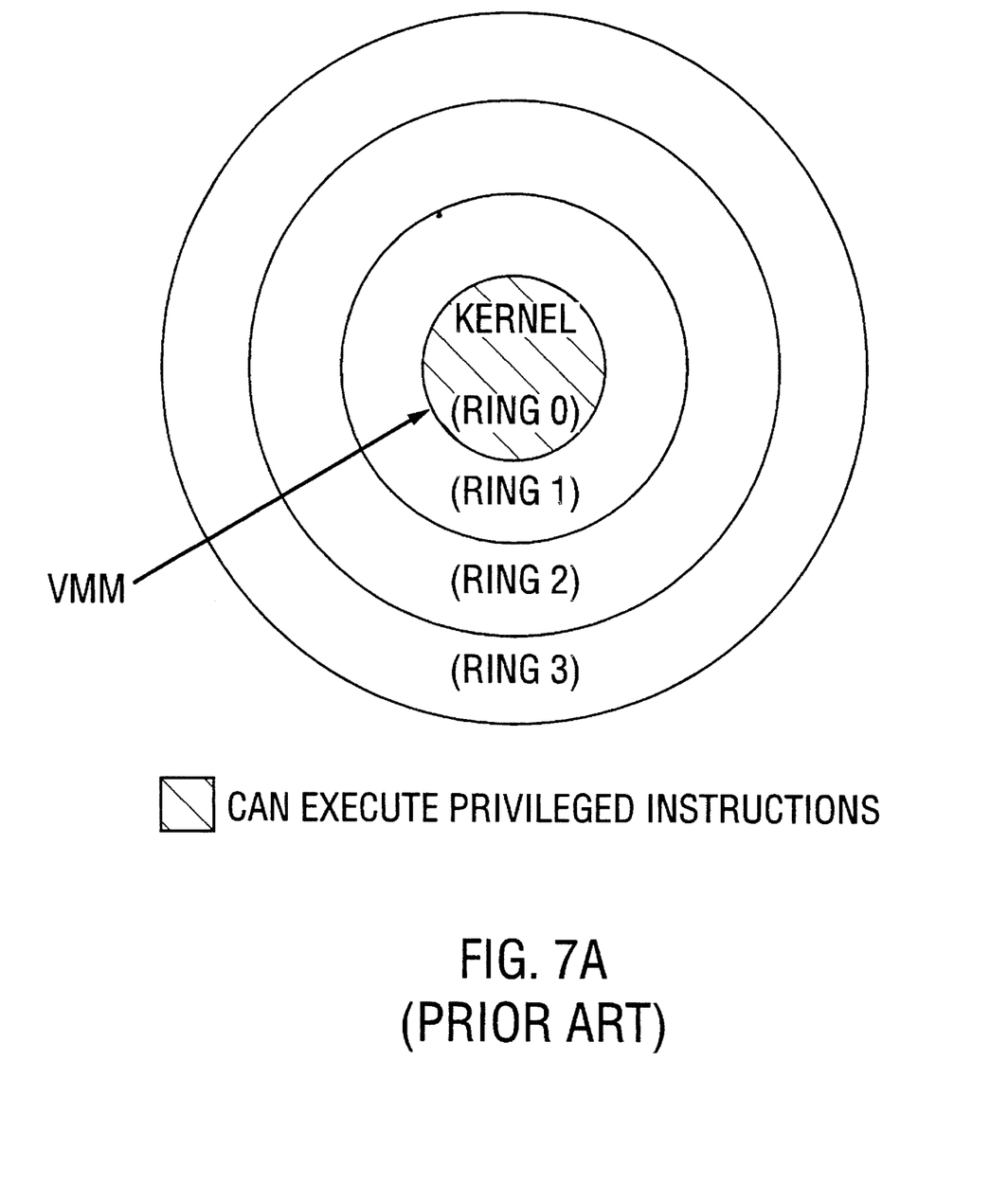
FIGS. 7A and 7B each illustrate the protection ring structures of the prior art and the present invention.

As noted above, and illustrated in FIG. 7A, in prior art systems there are both "privileged" instructions (instructions that trap to the most privileged mode if executed in any other mode) and "sensitive" instructions (instructions that have the potential to affect the privileged machine state). To implement a compressed ring system, it was virtually essential that the sensitive instructions consist of a subset of the privileged instructions. As noted above, however, in some instances certain sensitive instructions are not privileged. In such instances, compressed ring systems can be implemented if there is a way to either (a) make those instructions trap, whether or not they are privileged, or (b) make them not sensitive. Additional discussion on this point make be found in the above-referenced U.S. Pat. No. 4,787,031 to Karger et al. and the paper by J. Hall & P. Robinson, *Virtualizing the VAX Architecture*.

As discussed above, in some prior art systems, all privileged instructions (including the sensitive instructions) trapped to the VMM. Thus, in such systems the VMM's software (or the processor's firmware) had to be able to emulate all sensitive instructions issued by the VMs. As discussed above, the need to be able to handle virtually all privileged instructions greatly increased the complexity of the VMM. This is not the case with the present invention.

Figure 7B:
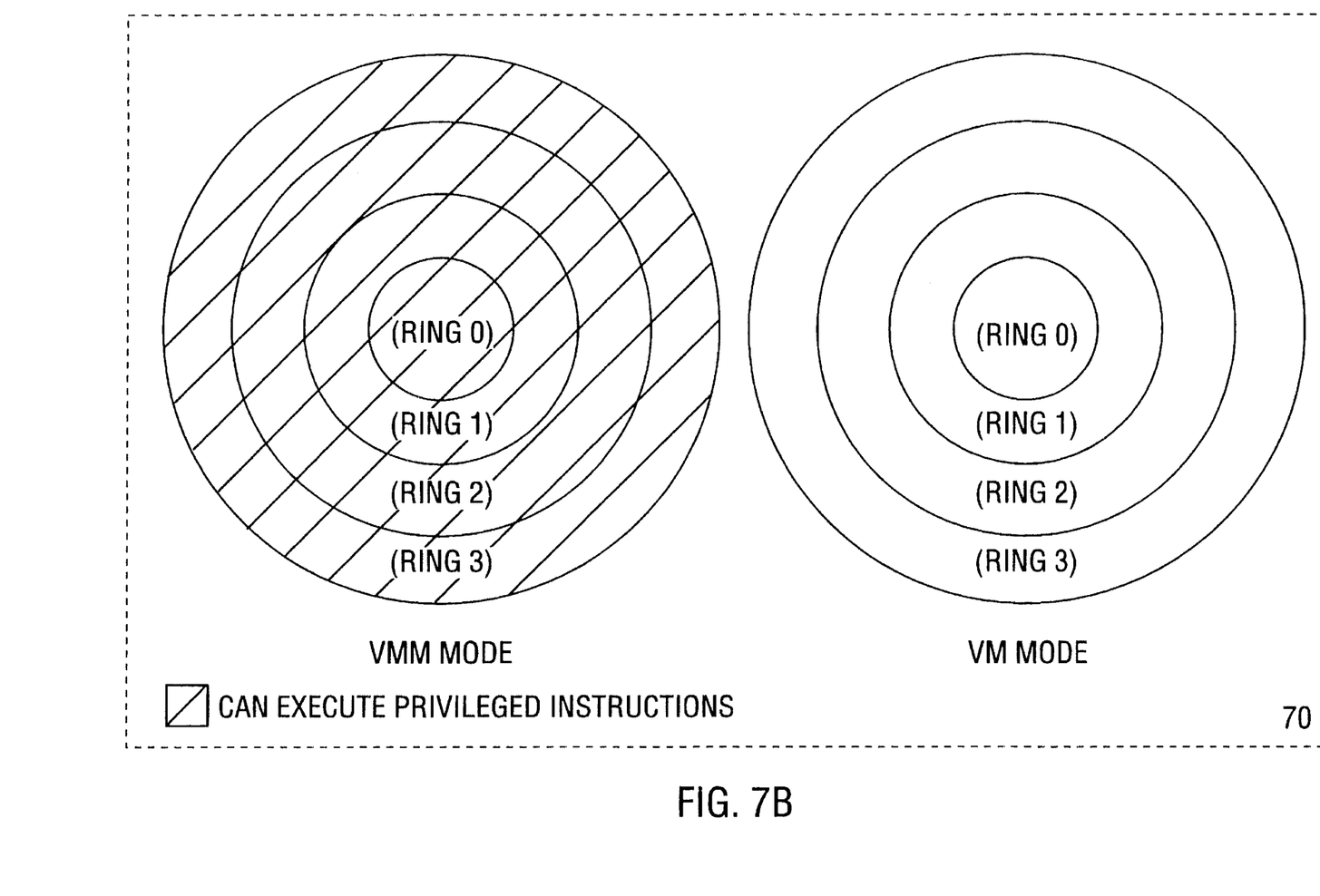

FIG. 7B illustrates the dual ring structure of the present invention 70. As may be noted, there are two sets of rings, one for the VMM and one for the VMs. The two rings are illustrated as separate for purposes of visualization only. Actually, the rings are essentially parallel having essentially identical ring structures in different address spaces.

There are various reasons that an instruction may be classed as sensitive. For example, as discussed above, any instruction that halts the execution of the processor is sensitive. Further, since in the present invention only the VMM can modify the address maps, any instruction that could be executed by a VM that could modify the address maps must also be classified as sensitive. There are other reasons an instruction may be classed as sensitive, not relevant here.

The specific instructions that are "sensitive" under the present dual-ting systems will depend on the type of hardware/firmware on which the system is implemented and the specific nature of the VMM used. However, once the group of sensitive instructions is selected, their execution in the present invention should be carried out as follows:

As noted above, in the present invention sensitive instructions are those that can be executed only by the VMM. Thus, if a VM attempts to execute such an instruction, it traps to the VMM. This may be done through the use of the VM-bit. Whenever the processor attempts to execute a sensitive instruction, it first checks to determine if the VM-bit is set. If the VM-bit is set (i.e., if the processor is running in the VM mode) then the system traps to a process in the VMM where the VMM can emulate the requested sensitive instruction. Emulation routines for the VMM are generally known in the art and will not further be discussed.

In one alternative of the present invention, the "trap" and emulation of sensitive instructions can be accomplished through firmware associated with the processor—not software in the VMM. In such an embodiment the firmware may be designed so that if execution of a sensitive instruction is attempted while the processor is in VM mode, the firmware itself will take control and emulate the sensitive instruction.

Such an embodiment may be beneficial since putting all of the emulation work in firmware (as opposed to software) generally improves system performance. The use of firmware emulation routines is generally known in the art.

4.3 Simplicity Advantages

As can be discerned, a key advantage of the present invention is its simplicity. The special advantages of the present invention can generally be obtained through two steps: (1) utilizing a VM-bit to determine if the processor is in VM or VMM mode and deciding how to handle sensitive instructions based on it; and (2) assigning the VMM exclusive use of an address space. Because these two modifications do not significantly affect the basic computing system (other than to increase security and allow for a more efficient VMM and VMs) the performance and functional impact on the bare machine should be minimal.

Additionally the implementation of the present invention should not require significant modification of existing systems because the present invention does not change the ring number assignment that is used in existing computers, nor does it alter the protection codes currently used to protect memory locations, or the basic memory management schemes in use today. Because of the elegance of the present invention, most basic processor instructions will not need to be modified.

Further, in the present invention ring compression is unnecessary. As noted above, in the present invention the VMM is removed from the address space used by the VM. This means the VMM does not rely on the protection ring mechanism for protection from access by VMs and that ring compression is unnecessary for protecting the VMM from access by VMs. An additional advantage of having the VMM in a separate address space is that the VMM does not intrude into the VM's address space. This is advantageous in that the VMM can access memory locations without affecting a virtual machine operating system (VMOS), even if the VMOS was not explicitly designed to run in a VM. It will be apparent to those of ordinary skill having the benefit of this disclosure that the design of a VMOS to be used in conjunction with a system in accordance with the invention can thus be simplified.

Finally, and perhaps most importantly, the present invention allows for a more elegant implementation of virtual machines than is available in the prior art. As noted, in the prior art, the VMs (whose operating system and software were designed to operate on a machine with a certain number of real rings) is forced to operate in an environment having only less than that number of real rings and the VMM is forced to operate in an environment having only one real ring, when efficiency and design consideration would dictate otherwise.

Under the present invention, a VM-bit is added to the computer system, indicating whether the processor is currently executing a VM or the VMM—all sensitive instructions trap if they are executed when the VM-bit is set and, in particular, all privileged instructions executed when the VM-bit is set will trap, regardless of the ring number. This means that the VM need not be excluded from the innermost ring for the sole purpose of making privileged instructions trap. That is, ring compression is not necessary to force privileged instructions to trap, because the VM-bit setting will force them to trap. As a result of the invention, therefore, no ring compression scheme is required in the virtual machine system and the VM may make use of all real rings available on the machine. Further, the VM may freely read or modify the ring number, without intervention by the VMM. This means that any instruction which reads or modifies the ring number is not sensitive (in this virtual machine system). By eliminating the sensitivity of these instructions, the number of instructions that the VMM must emulate is reduced, simplifying the VMM and improving performance.

In summary, the VM operating environment in the present invention is essentially the environment in which the VM software was designed to run. This provides a more efficient implementation of the VMs.

5. CLAIMS

We claim as our invention:

1. A computer system comprising:
   (a) processor means for processing instructions;
   (b) memory means for storing and retrieving said instructions from a memory;
   (c) virtual machine monitor means having a first virtual memory space and executing on said processor means in a first plurality of protection modes;
   (d) virtual machine means having a second virtual memory space and executing on said processor means in a second plurality of protection modes where said second plurality of protection modes is distinct from said first plurality of protection modes, said virtual machine means executing a first process, said first process issuing a first set of instructions; and
   (e) means for indicating whether a particular instructions was issued by a process executing under the virtual machine means for the purpose of trapping said particular instruction for execution by the virtual machine monitor means.

2. The computer system of claim 1 wherein the means for indicating whether said particular instruction was issued by a process executing under the virtual machine means includes a specified bit location in said memory and wherein a certain group of instructions will only execute if the specified bit location in memory indicates that the particular instruction was not issued by a process executing under the virtual machine means.

3. The computer system of claim 2 wherein said specified bit location is selected from the group consisting of main memory, external hard disk memory, and one or more internal data registers in said digital data processor.

4. The computer system of claim 1 further including a second process executing under the virtual machine monitor means, said second process issuing a second set of instructions, wherein both the first and second sets of instructions include at least one instruction executable in each of the first and second plurality of protection modes.

5. The computer system of claim 4 wherein the processor means comprises a single digital data processor.

6. The computer system of claim 4 wherein there are four protection modes.

* * * * *